United States Patent [19]  [11] 3,762,909
Davie et al.  [45] Oct. 2, 1973

[54] PHOSPHORUS-BORATE GLASS FRITS AS PLANT MICRO NUTRIENT CARRIERS

[75] Inventors: William R. Davie, Hopewell Twsp., Beaver County, Pa.; Lonzo F. Green, West Palm Beach, Fla.

[73] Assignee: United States Steel Corporation

[22] Filed: June 10, 1971

[21] Appl. No.: 151,947

[52] U.S. Cl. ...................... 71/1, 71/64 G, 106/47 R
[51] Int. Cl. .............................................. C05d 9/02
[58] Field of Search .................. 71/1, 33, 34, 64 G; 106/47 R; 423/314

[56] References Cited
UNITED STATES PATENTS

| | | | |
|---|---|---|---|
| 2,988,439 | 6/1961 | Gloss | 71/1 |
| 2,732,290 | 1/1956 | Vane et al. | 71/1 |
| 2,806,773 | 9/1957 | Pole | 71/64 G |
| 3,172,752 | 3/1965 | Pierce | 71/1 X |
| 3,520,831 | 7/1970 | Trap | 106/47 R |
| 3,393,060 | 7/1968 | Blair et al. | 106/47 R |
| 3,328,181 | 6/1967 | Weidel | 106/47 R |
| 2,934,444 | 5/1960 | Smith | 106/47 R |
| 2,379,100 | 6/1945 | Partridge | 423/314 X |
| 2,365,489 | 12/1944 | Partridge | 423/314 X |
| 2,100,391 | 11/1937 | Grimm et al. | 106/47 R |
| 2,920,972 | 1/1960 | Godron | 106/47 R |
| 2,291,958 | 8/1942 | Garrison | 106/47 R |
| 2,390,191 | 12/1945 | Stanworth | 106/47 R |
| 3,113,033 | 12/1963 | Hoxie et al. | 106/47 R |
| 2,577,627 | 12/1951 | Pincus | 106/47 R |
| 2,227,082 | 12/1940 | Heidelbers et al. | 106/47 R |

Primary Examiner—Samih N. Zaharna
Assistant Examiner—Richard Barnes
Attorney—William L. Krayer et al.

[57] ABSTRACT

Vitreous compositions of phosphorus-borate glass and oxides of various metals fused and adapted to cause a slow release of nutrient materials to plants and a process for their production.

6 Claims, No Drawings

PHOSPHORUS-BORATE GLASS FRITS AS PLANT MICRO NUTRIENT CARRIERS

BACKGROUND OF THE INVENTION

The importance of trace elements, such as iron, zinc, manganese, boron, copper, sodium, sulfur, magnesium, calcium and molybdenum to plant growth is well-known in plant physiology. With the application of primary nutrient fertilizers (nitrogen, phosphorus, potassium) and the intensification of plant culture per acre, the need for these nutrients has also increased.

Because plants need only small quantities of these trace nutrients, and because excess quantities of these trace nutrients are phytotoxic, the rate of trace nutrient release must be strictly controlled. Several tests have been devised to measure the release rates of micro nutrients and to correlate these rates with plant toxicity levels.

Of the micro nutrients, boron is the most toxic to plants. Thus, where a high level of boron is contained in the micro nutrient material, care must be taken to insure that the boron release rate is controlled within narrow limits. A test procedure has been developed to rapidly determine the boron release rate from glass frit type micro nutrient fertilizers of commercially useful composition. As reported by Holden et al, in the *Journal of the A.O.A.C.* 45 455–463 (1962) this test involves subjecting the glass frits to 4 hours of leaching at 25° C with a 0.05 molar aqueous sodium bicarbonate solution adjusted to a pH of 9.4 with sodium hydroxide. Plant tests have shown that when 8.3 weight percent or more of the total boron present is released from a glass frit of commercially useful composition within the four hour test period the fertilizer is toxic to corn plants. Other plants are not as susceptible as is corn to an excess of boron but since a multi-purpose frit is desirable, it is necessary to prevent the boron release rate from the frit from rising to 8.3 weight percent or above. Preferably, the release rate is kept below 6.0 weight percent within the four hour test period.

Materials that permit controlled release of trace nutrients such as finely-ground silicate-borate glass frits have been developed (British Patent 823,216). These frits are mixed with primary nutrient sources containing phosphorus, nitrogen and potassium and are then added to the soil. As these frits are insoluble in water, the elements are not leached from the soil and do not react chemically with the soil; therefore, they are more available to growing plants over a longer period of time than are soluble trace nutrients. However, there is a tendency for a gelatinous coating of silica to coat the exterior of these frits, which results in a non-continuous release of the nutrients. Further, the extremely high temperatures which are necessary to fuse the silica cause production difficulties and attack the furnace refractories.

Accordingly, the objects of this invention are (1) to provide a glass frit which continuously releases nutrient materials to the growing plant, (2) to provide a material which releases trace nutrients to growing plants without danger of phytotoxicity, (3) to provide a phosphorus source to plants which is less readily available than that obtained from the primary nutrient materials, thus assuring a more uniform supply to the growing plants, (4) to provide a frit which may be fused at a temperature lower than that necessary to fuse silica frits, even when containing higher trace nutrient content, (5) to provide a glass frit composed solely of nutrient materials, and (6) to provide a frit which does not form a gelatinous exterior coating.

SUMMARY OF THE INVENTION

We have discovered an easy and convenient method of preparing a more concentrated trace nutrient plant fertilizer containing essentially no inert ingredients. In our novel process, such trace nutrients as are deemed desirable are combined with a phosphate source and fused with a borate glass. The novel frits so produced are an improvement over the vitreous silicates in that our frit contains one of the primary nutrients, phosphate, which is needed for plant growth. Most importantly, our frits do not form a gelatinous exterior coating which can result in discontinuous leaching. Since the frits contain phosphorus, more concentrated trace nutrient-containing primary nutrient fertilizers can be formulated than could be formulated when silicate frits are the source of trace nutrients.

In preparing our novel frits, four factors must be taken into consideration. These are: (1) the quantity of frits used per unit of primary fertilizer and the amount of combined fertilizer used per acre, (2) the amount of boron present in the frit, (3) the boron release rate of the frit, i.e., the percentage of solubles in the frit, and (4) the size of the frit. We have found that when standard fertilization practices are followed as to the first of these four factors the permissible ranges for the other three are:

Boron present                  Up to 5 weight percent
Boron release rate Less than 8.3 weight percent of contained boron in 4 hour period*
Frit Size                         +200 to −40 mesh
*Using aqueous sodium bicarbonate each solution per test procedure reported in *Journal of the A.O.A.C.* 45 455–463 (1962)

When boron content of frits is under one weight percent, as in the examples 6 through 9 where frits are used mainly for correction of zinc, manganese, iron or copper deficiencies, boron toxicity is not a major consideration and particle size is not as critical and may be −200 mesh or +40 mesh as well. The components and amounts of each component in our novel composition are summarized in the following table.

|  | Maximum | Preferred | |
|---|---|---|---|
| Solubles | 25–60 | 30–55 | |
| Borate | 2–20 | 10–18 | 2–10 |
| Phosphate Matrix | 15–55 | 20–34 | 25–51 |
| Insolubles | 40–75 | 45–70 | |

DETAILED DESCRIPTION

Our frits are formed by mixing finely-ground salts of the desired nutrient materials with a borate source and a phosphorus source, heating to about 900°–1,000° C to fuse, and quenching immediately. The nutrient materials added are those generally referred to as trace nutrients and include, for example, compounds of copper, iron, manganese, molybdenum, zinc, boron, sodium, magnesium and calcium. The selected nutrients are ground before fusing to shorten the time necessary for fusion. We prefer to use nutrient materials which have been ground to below 30 mesh size. This size may vary over a large range and larger particles may be used if a less rapid fusion can be tolerated. The trace nutrients should be present in compounds which are degradable to the oxide form under fusion conditions so as to allow easy dissolution in the borate. We prefer to use nutrient materials in the oxide or carbonate form. The individual nutrient materials may be present in any desired amount provided only that the total insoluble nutrient materials comprise about 40 to 75 weight percent, preferably about 45 to 70 weight percent of the frit when calculated as the oxide.

A borate is used to provide the trace nutrient boron to the frit composition. The borate also serves to dissolve the oxides of the other trace nutrients and is responsible for the formation of the glass when quenched. It should preferably be water soluble. Specific compounds which have been found useful in the practice of our invention include, for example, $KB_5O_8 \cdot 4H_2O$, $Na_2B_4O_7 \cdot 10H_2O$, $Na_2Ca_2B_{10}O_{18} \cdot 16H_2O$, $Na_4B_{10}O_{17} \cdot 7H_2O$, $Ca_2B_6O_{11} \cdot 5H_2O$, $CaMgB_6O_{11} \cdot 6H_2O$, $Mg_2B_6O_{11} \cdot 15H_2O$, $CaB_2O_4$, $Ca_2B_6O_{11} \cdot 7H_2O$, and $Mg_7Cl_2B_{16}O_{30}$ and their anhydrous analogues, and $H_3BO_3$, $B_2O_3$ and the like. $Na_2B_4O_7 \cdot 10H_2O$ and its anhydrous analogue are preferred. The borate calculated as $Na_2B_4O_7$ should preferably comprise from about 2 to about 20 weight percent of the composition. Crops with low boron requirements are best served by frits containing about 2 to 10 weight percent borates; high boron requirement crops are best served by frits containing about 10 to 18 weight percent borate.

A phosphate is added to the fusion mixture to promote solubility of the frit and to provide a source of slow release phosphorus, which, when used in conjunction with the quick release phosphate in the primary fertilizer material, gives a balanced phosphorous release rate. The phosphate must be used in conjunction with the borate to provide sufficient solubles in the frit which in turn is necessary to give an acceptable release rate. If borate alone were used to provide solubles sufficient to give an acceptable release rate, the boron level would be so high as to by phytotoxic.

To obtain the advantages of our invention, the molar ratio of the metal cation, if any, in the borate compound plus the metal cation, if any, in the phosphate compound to the phosphate anion should be between about one-half to 1 and 2 to 1, preferably about 1 to 1. At lower ratios it becomes impossible to fuse the components at the desired fusion temperature. At higher ratios the release rate is increased to phytotoxic levels.

The phosphate may be used in any suitable form. The phosphate should preferably be water soluble, should have phosphorus in the +5 valence state and the cation should be hydrogen or a plant nutrient material. Thus, the phosphate may be introduced in acid form, as an anhydride, or as the salt of an alkali or alkaline earth metal. Representative compounds are the acids $HPO_3$, $H_3PO_4$ the anhydride $P_2O_5$ or the salts $NaPO_3$, $Na_3PO_4$, $NaH_2PO_4$, $Na_2HPO_4$, $Na_4P_2O_7$, $NaH_2P_2O_7$, $K_4P_2O_7$, $K_2HPO_4$, $KH_2PO_4$, $K_3PO_4$, $KPO_3$, $Mn(H_2PO_4)_2$, $MnHPO_4$, $Mn_3(PO_4)_2$, $Ca(H_2PO_4)_2$, $MgHPO_4$. These compounds may be used individually or in mixture. It is most convenient to use a mixture of meta-phosphoric acid ($HPO_3$) and sodium meta-phosphate ($NaPO_3$). This mixture is a readily available standard chemical reagent. The large hygroscopic crystals of this mixture contain 35% $HPO_3$, 60% $NaPO_3$, and 5 percent impurities, presumably water. Alternatively, a more economical mixture of sodium hydrogen phosphate and orthophosphoric acid having an equivalent $Na_2O/P_2O_5$ ratio may be used. The phosphate compound or mixture used in the frit will be referred to as the phosphate matrix. The phosphate matrix should comprise from about 15 to about 55 weight percent of the composition, preferably from about 20 to about 34 weight percent if the borate is in the range of 10 – 18 percent and preferably 25 – 51 weight percent if the borate is low in the 2 – 10 percent range.

The borate and phosphate matrix comprise the soluble portion of the glass frit. We have found that the amount of solubles in the frit may vary over a wide range, as from about 25 to about 60 weight percent of the frit with from 30 to about 55 weight percent being preferable.

The nutrient materials comprise the insoluble portion of the frit. If desired, one or more of the trace nutrients may be left out of the formulation thus allowing higher concentration of the other nutrients in the frit. Where, for example, zinc levels in the soil are high enough to supply sufficient zinc, zinc may be omitted from the frit and the amount of the other micro nutrients may be increased. Conversely, where a severe deficiency of one element is encountered, one element may be greatly increased in the frit. The nutrient materials are added to the borate and phosphate matrix in finely ground form, preferably below 30 mesh size. We prefer to use the oxides of the nutrient materials, however, other compounds containing the desired nutrient may also be used.

The composition to be fused is placed in a furnace preheated to about 1,000° C or above. The composition is allowed to fuse for approximately one-half hour and is then removed and immediately quenched, preferably in cold water. The immediate quench which lowers the temperature of the frit to under 100° C less than 1 minute is necessary to give the glassy texture of the product and to produce the most desirable glass frit. After drying the frits are finely ground in a conventional manner to the desired size.

The size to which the frit is ground affects the boron release rate. With a high boron frit this rate must be kept below about 8.3 percent and preferably below about 6.0 percent in a 4-hour period under the specified test conditions or phytotoxicity occurs. These precentage figures have been correlated with the toxicity level of boron to plants and to standard amounts of fertilizer applied per acre of ground.

The ratio of solubles to insolubles in the frit also affects the boron release rate. This ratio must be correlated with frit size and total boron present in order to determine the composition of an acceptable frit. We have found that the generally usable range for boron in the composition is from about 2 to about 20 weight percent $Na_2B_4O_7$ (about 0.4 to 4.3 weight percent boron). The optimum range for boron in the composition is from about 10 to about 18 weight percent $Na_2B_4O_7$ (about 2.2 to 3.8 weight percent boron) for high boron requirement crops and from about 2 to about 10 weight percent $Na_2B_4O_7$ (about 0.4 to 2.2 weight percent boron) for low boron requirement crops. We have found that suitable frit sizes range from a minimum of about 200 mesh to a maximum of 40 mesh or even larger when the $Na_2B_4O_7$ content is above about 5 weight percent $Na_2B_4O_7$. Since there is no absolutely critical minimum release rate, the frits could be made as large as is desired, taking into consideration practical distribution problems and the like. With the frit size and boron weight percentage variables in the above ranges, the optimum range of solubles (phosphate and borate) in the frit should be between about 30 and about 55 weight percent. In low boron frits particle size is not critical so frits of −200 mesh could be used.

Within the above ranges, the exact release rate may vary somewhat, depending on the particular nutrients present, the fusion conditions, and the quenching conditions. In the following examples, we show the procedures necessary to invariably produce frits with the desired release rates. As persons skilled in the art will be capable of varying the ratios of ingredients used, we do not intend to be limited to the exact compositions described.

EXAMPLE 1

25 g. of a sample with the following composition (example 1 below) are placed in a platinum crucible. A furnace is preheated to about 900°–1,000° C after which the sample is placed in the furnace and heated for about 30 minutes. The crucible is removed and the sample quenched by pouring it into cold water (20° C). The glassy product is dried and ground to −200 mesh size frits which are then placed in a 0.05 molar aqueous sodium bicarbonate solution adjusted to a pH of 9.4 by the addition of sodium hydroxide. Temperature of the solution is 25° C. At the end of the 4-hour test period, the quantity of boron leached is determined by the "identical pH" method, *A.O.A.C. Official Methods of Analysis* 8th Ed., p. 19. It is determined that 5.8 weight percent of the boron present in the frit was leached by the solution in the 4-hour period. Composition — Example 1

| Component | Weight Percent | Approximate Elemental Content | |
|---|---|---|---|
| $Na_2B_4O_7$ | 20.2 | Boron | 4.4% |
| CuO | 9.1 | Copper | 7.3% |
| $Fe_2O_3$ | 21.7 | Iron | 15.2% |
| $MnO_2$ | 12.2 | Manganese | 7.8% |
| $MoO_3$ | 0.1 | Molybdenum | 0.07% |
| ZnO | 6.1 | Zinc | 4.9% |
| Phosphate matrix | 30.6 | Phosphorus | 10% |

EXAMPLE 2

Procedure as in Example 1. Frit size of this sample was −80 to +100. The composition is different from that of Example 1 (no ZnO) but soluble-insoluble ratio is approximately the same. The boron released is 6.28 weight percent of that present in the frit. This shows that the particular nutrients present slightly affect the release rate.

COMPOSITION — EXAMPLE 2

| Component | Weight Percent |
|---|---|
| $Na_2B_4O_7$ | 20.0 |
| CuO | 9.9 |
| $Fe_2O_3$ | 25.0 |
| $MnO_2$ | 13.2 |
| $MoO_3$ | 1.3 |
| Phosphate matrix | 30.6 |

EXAMPLE 3

To show that compounds other than pure oxides of the nutrient materials may be used, dry ferro manganese filter cake, a by-product from the production of ferro manganese is used to partially replace manganese dioxide in the sample. The elemental composition of the ferro manganese cake is:

| Element | Weight Percent |
|---|---|
| Si | 4.49 |
| Ca | 9.50 |
| Mg | 1.62 |
| Mn | 18.15 |
| Fe | 1.28 |
| C | 7.99 |
| H | 1.35 |
| N | <0.05 |

A frit of the following composition employing the ferro manganese cake, is prepared according to the procedure of Example 1. Frit size is −200 mesh. Boron release is 6.0 weight percent.

COMPOSITION — EXAMPLE 3

| Component | Weight Percent |
|---|---|
| $Na_2B_4O_7$ | 17.7 |
| CuO | 8.8 |
| $Fe_2O_3$ | 20.0 |
| $MnO_2$ | 9.1 |
| $MoO_3$ | 0.1 |
| ZnO | 6.2 |
| Ferromanganese cake | 7.5 |
| Phosphate matrix | 30.6 |

EXAMPLE 4

To show the influence of particle size, samples having the following composition are prepared according to the procedure of Example 1 and are ground to the several mesh sizes with the following results.

COMPOSITION — EXAMPLE 4

| Component | Weight Percent | Approximate elemental content | |
|---|---|---|---|
| $Na_2B_4O_7$ | 14.3 | Boron | 3.1% |
| CuO | 5.0 | Copper | 4.0% |
| $Fe_2O_3$ | 23.0 | Iron | 16.1% |
| $MnO_2$ | 5.2 | Manganese | 3.3% |
| $MoO_3$ | 0.1 | Molybdenum | 0.07% |
| ZnO | 5.0 | Zinc | 4.0% |
| Phosphate matrix | 47.4 | Phosphorus | 15.5% |

Boron Release Rates as a Function of Particle Size

| Particle Mesh Size | 40 to 60 | 60 to 100 | 100 to 200 | −200 |
|---|---|---|---|---|
| Total Boron released in 4 hr., % | 2.3 | 6.3 | 6.6 | 8.3 |

EXAMPLE 5

The "availability" of the phosphorus in frits is compared to triple superphosphate and rock phosphate. All materials are sieved to −200 mesh before analysis. The results of the tests are shown below.

a comparison of phosphorus pentoxide availability

| Samples | Total $P_2O_5$, wt. % | Available $P_2O_5$, wt. % | Percentage of Total $P_2O_5$ as Available $P_2O_5$ |
|---|---|---|---|
| Rock Phosphate | 31.00 | 24.00 | 75.8 |
| Triple Superphosphate | 48.00 | 47.76 | 99.5 |
| Phosphate Glass Frit (formulation 1) | 24.04 | 18.60 | 77.4 |

The results show that the phosphorus in the frit (formulation 1) is as available to growing plants as finely-ground rock phosphate, but is not as available to growing plants as triple superphosphate. Water-solubility tests show that the individual trace nutrients, other than boron, are soluble only to the extent of less than 0.01 weight percent. This is important as it would tend to reduce trace-element leaching losses from sandy soil.

EXAMPLE 6

To show a specific composition containing a high level of zinc and low level of boron. Procedure as in Example 1. The low level of boron in the frit allows wide variation in boron release rate without harm to crops.

COMPOSITION — EXAMPLE 6

| Component | Weight Percent | Approximate elemental content |
|---|---|---|

| | | | wt. % |
|---|---|---|---|
| Na$_2$B$_4$O$_7$ | 2.3 | Boron | 0.5 |
| CuO | 1.9 | Copper | 1.5 |
| Fe$_2$O$_3$ | 5.8 | Iron | 4.0 |
| MnO$_2$ | 2.4 | Manganese | 1.5 |
| MoO$_3$ | 0.022 | Molybdenum | 0.015 |
| ZnO | 37.0 | Zinc | 30.0 |
| Phosphate Matrix | 50.6 | | |

EXAMPLE 7

To show a specific composition containing a high level of manganese and low level of boron. Procedure as in Example 1. The low level of boron in the frit allows wide variation in boron release rate without harm to crops.

COMPOSITION — EXAMPLE 7

| Component | Weight Percent | Approximate elemental content | wt. % |
|---|---|---|---|
| Na$_2$B$_4$O$_7$ | 2.3 | Boron | 0.5 |
| CuO | 1.9 | Copper | 1.5 |
| Fe$_2$O$_3$ | 5.8 | Iron | 4 |
| MnO$_2$ | 48 | Manganese | 30 |
| MoO$_3$ | 0.022 | Molybdenum | 0.015 |
| ZnO | 1.9 | Zinc | 1.5 |
| Phosphate Matrix | 40.1 | | |

EXAMPLE 8

To show a specific composition containing a high level of iron and low level of boron. Procedure as in Example 1. The low level of boron in the frit allows wide variation in boron release rate without harm to crops.

COMPOSITION — EXAMPLE 8

| Component | Weight Percent | Approximate elemental content | |
|---|---|---|---|
| Na$_2$B$_4$O$_7$ | 2.3 | Boron | 0.5% |
| CuO | 1.9 | Copper | 1.5% |
| Fe$_2$O$_3$ | 43 | Iron | 30% |
| MnO$_2$ | 2.4 | Manganese | 1.5% |
| MoO$_3$ | 0.022 | Molybdenum | 0.015% |
| ZnO | 1.9 | Zinc | 1.5% |
| Phosphate Matrix | 48.5 | | |

EXAMPLE 9

To show a specific composition containing a high level of copper and low level of boron. Procedure as in Example 1. The low level of boron in the frit allows wide variation in boron release rate without harm to crops.

COMPOSITION — EXAMPLE 9

| Component | Weight Percent | Approximate elemental content | |
|---|---|---|---|
| Na$_2$B$_4$O$_7$ | 2.3 | Boron | 0.5% |
| CuO | 37 | Copper | 30% |
| Fe$_2$O$_3$ | 5.8 | Iron | 4% |
| MnO$_2$ | 2.4 | Manganese | 1.5% |
| MoO$_3$ | 0.022 | Molybdenum | 0.015% |
| ZnO | 1.9 | Zinc | 1.5% |
| Phosphate Matrix | 50.6 | | |

We claim:

1. A fertilizer composition for imparting micronutrients, phosphorous and boron to soil, and having a boron release rate of less than 8.3 percent by weight, a micronutrient release rate of less than 0.010 percent by weight and at least 75 percent available phosphorous, said composition being obtained by the steps of:

a. preparing a mixture of water insoluble micronutrient source, a water soluble borate, and a phosphate consisting of a mixture of sodium metaphosphate and metaphosphoric acid, said micronutrient source being selected from the group consisting of the oxides and carbonates of copper, iron, manganese, molybdenum, zinc, magnesium, calcium and mixtures thereof, said borate being present in an amount of about 20 percent by weight calculated as Na$_2$B$_4$O$_2$·10H$_2$O, said phosphate being present in an amount of about 31 percent by weight, said micronutrient source being the remainder, and the molar ratio of the sum of the metal cation in the borate and the metal cation in the phosphate to the phosphate anion is between 1:2 and 2:1, b. fusing said mixture to a homogenous mass at a temperature of 900° to 1,000° C, c. quickly quenching said mixture to produce a frit, and d. grinding said frit and recovering sizes from 200 mesh to 40 mesh.

2. The composition of claim 1 wherein the ratio of said metal cations to phosphate anion is about 1:1.

3. A mixed fertilizer comprising a source of potassium, phosphorous, and nitrogen as a major component and the composition of claim 1 as a minor component.

4. A fertilizer composition for imparting micronutrients, phosphorous and boron to soil and having a boron release rate of less than 8.3 percent by weight, a micronutrient release rate of less than 0.010 percent by weight and at least 75 percent available phosphorous, said composition being obtained by the steps of:

a. preparing a mixture of water insoluble micronutrient source, a water soluble borate, and a phosphate consisting of a mixture of sodium metaphosphate and metaphosphoric acid, said micronutrient source being selected from the group consisting of the oxides and carbonates of copper, iron, manganese, molybdenum, zinc, magnesium, calcium and mixtures thereof, said borate being present in an amount of about 2 percent by weight by weight calculated as Na$_2$B$_4$O$_2$·10H$_2$O, said phosphate being present in an amount of about 51 percent by weight, said micronutrient source being the remainder, and the molar ratio of the sum of the metal cation in the borate and the metal cation in the phosphate to the phosphate anion is between 1:2 and 2:1, b. fusing said mixture to a homogeneous mass at a temperature of 900° to 1,000° C, c. quickly quenching said mixture to produce a frit, and d. grinding said frit and recovering sizes from 200 mesh to 40 mesh.

5. The composition of claim 4 wherein the ratio of said metal cations to phosphate anion is about 1:1.

6. A mixed fertilizer comprising a source of potassium, phosphorous and nitrogen as a major component and the composition of claim 4 as a minor component.

* * * * *